(12) United States Patent
Rangaraj

(10) Patent No.: US 11,917,082 B2
(45) Date of Patent: Feb. 27, 2024

(54) THIRD PARTY CERTIFICATE MANAGEMENT FOR NATIVE AND THIRD PARTY MOBILE APPS

(71) Applicant: Capital One Services, LLC, McLean, VA (US)

(72) Inventor: Srinivasan Rangaraj, San Jose, CA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 17/400,544

(22) Filed: Aug. 12, 2021

(65) Prior Publication Data

US 2023/0049095 A1 Feb. 16, 2023

(51) Int. Cl.
*H04L 9/32* (2006.01)
*H04L 9/40* (2022.01)

(52) U.S. Cl.
CPC .......... *H04L 9/3268* (2013.01); *H04L 9/3265* (2013.01); *H04L 63/1466* (2013.01)

(58) Field of Classification Search
CPC . H04L 9/3268; H04L 9/3265; H04L 63/1466; H04L 63/0823; H04W 84/12; H04W 12/122; H04W 12/37; H04W 12/069
See application file for complete search history.

(56) References Cited

U.S. PATENT DOCUMENTS

| 6,230,266 | B1* | 5/2001 | Perlman ................ H04L 9/3268 713/158 |
| 10,715,547 | B2 | 7/2020 | Edwards et al. |
| 10,762,406 | B2 | 10/2020 | Singh et al. |
| 10,873,641 | B2 | 12/2020 | Benson et al. |
| 11,321,718 | B1* | 5/2022 | Narendranathan ..... G06F 21/64 |
| 2019/0379549 | A1* | 12/2019 | Sundar .................. H04L 9/3268 |

(Continued)

OTHER PUBLICATIONS

Abbas et al., "Studying TLS Usage in Android Apps" CoNEXT '17: Proceedings of the 13th International Conference on emerging Networking EXperiments and Technologies.pp. 358-359 (Year: 2017).*

*Primary Examiner* — Farid Homayounmehr
*Assistant Examiner* — Mudasiru K Olaegbe
(74) *Attorney, Agent, or Firm* — Sterne, Kessler, Goldstein & Fox P.L.L.C.

(57) ABSTRACT

Systems and methods are disclosed herein for real-time digital authentication. According to some embodiments, a certification authentication method includes receiving a list of third party root certificates from a remote server, the list of third party root certificates including at least one association between a program configured to run on the computing apparatus and a public key for authenticating communication between the program and an associated server of the program. The method may also include authenticating the list of third party root certificates. The method may also include initiating a communication between the computing apparatus and the associated server and authenticating the communication with the associated server using the public key. Furthermore, the method may also include loading the program onto the one or more memories during a bootstrapping process in response to determining that the communication with the associated server is authentic.

20 Claims, 6 Drawing Sheets

(56) References Cited

U.S. PATENT DOCUMENTS

| | | |
|---|---|---|
| 2020/0236114 A1 | 7/2020 | Patil et al. |
| 2020/0288305 A1* | 9/2020 | Bok .................... H04L 63/0823 |
| 2021/0056200 A1* | 2/2021 | Rudnik .................. G06F 21/53 |
| 2021/0334380 A1* | 10/2021 | Saluja .................. G06F 21/572 |
| 2021/0377051 A1* | 12/2021 | Pai ........................ H04L 9/3263 |
| 2022/0014389 A1* | 1/2022 | Nix ......................... H04L 9/006 |
| 2022/0045986 A1* | 2/2022 | Lo ........................... H04L 63/08 |

* cited by examiner

THIRD PARTY CERTIFICATE MANAGEMENT FOR NATIVE AND THIRD PARTY MOBILE APPS

TECHNICAL FIELD

The present disclosure relates generally to systems and methods for digital certificate management, and more particularly to a system and method for managing certificate pinning of third party certificates in a native mobile application and/or third party mobile application incorporating software development kits (SDKs) within mobile devices.

BACKGROUND

Digital certificates may be used in the field of network communications by a client device to authenticate the identity of a remote host, allowing for secure, trusted communications. A host computer, such as a web server operated by a business, may issue a digital certificate that contains a public key, the identity of the entity which owns the certificate, and a digital signature of the issuer of the certificate. A client device, such as a mobile phone running a mobile application ("mobile app") may download the certificate and use it to verify the authenticity of communications with the remote host purporting to be the named entity. In encrypted network communications, such as communications with an HTTPS-based website, a digital certificate may be used to protect users against unauthorized access to their confidential information or other attacks from third parties.

In order to maintain a high level of information security, issuers and owners of digital certificates may require that the certificates expire after a defined time period and that they be changed periodically by the issuer. The lifespan, expiration, and updating of digital certificates are a part of digital certificate lifecycle management. In situations where one business operates and maintains both the mobile app and the remote host (e.g., web server), that business can coordinate the updating of digital certificates so that the mobile app is configured to receive and store the updated digital certificate from the web server. This process of associating a trusted host computer with a digital certificate is sometimes referred to as "pining" and may involve storing the public key of the digital certificate locally with the mobile app to locally verify the identity of a remote host before establishing a trusted connection.

However, many mobile apps also communicate with remote hosts operated by third parties. For example, a mobile app operated and maintained by a financial institution may communicate with a remote host operated by a third party merchant. In this situation, the third party remote host updates its digital certificate according to its own certificate lifecycle management schedule. With no control over the certificate lifecycle management of such third party hosts, the mobile app provider may face challenges in aligning the updates of third party certificates with updates of its mobile app. This lack of control may introduce security vulnerabilities in the mobile app. For example, dynamically updating certificates stored locally may cause the mobile app to be vulnerable to man-in-the-middle attacks purporting to be a trusted third party host. This is especially problematic where the mobile app runs one or more third party software development kits (SDKs) used for data collection because most SDKs do not have the ability to perform a pinning operation. Systems and methods of the present disclosure solve this problem and minimize communication vulnerabilities.

DETAILED DESCRIPTION

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other embodiments of the disclosure. While methods described herein may have steps described in a specified order, it will be understood that some of those steps may be re-arranged or performed in a different order. Additionally, embodiments may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
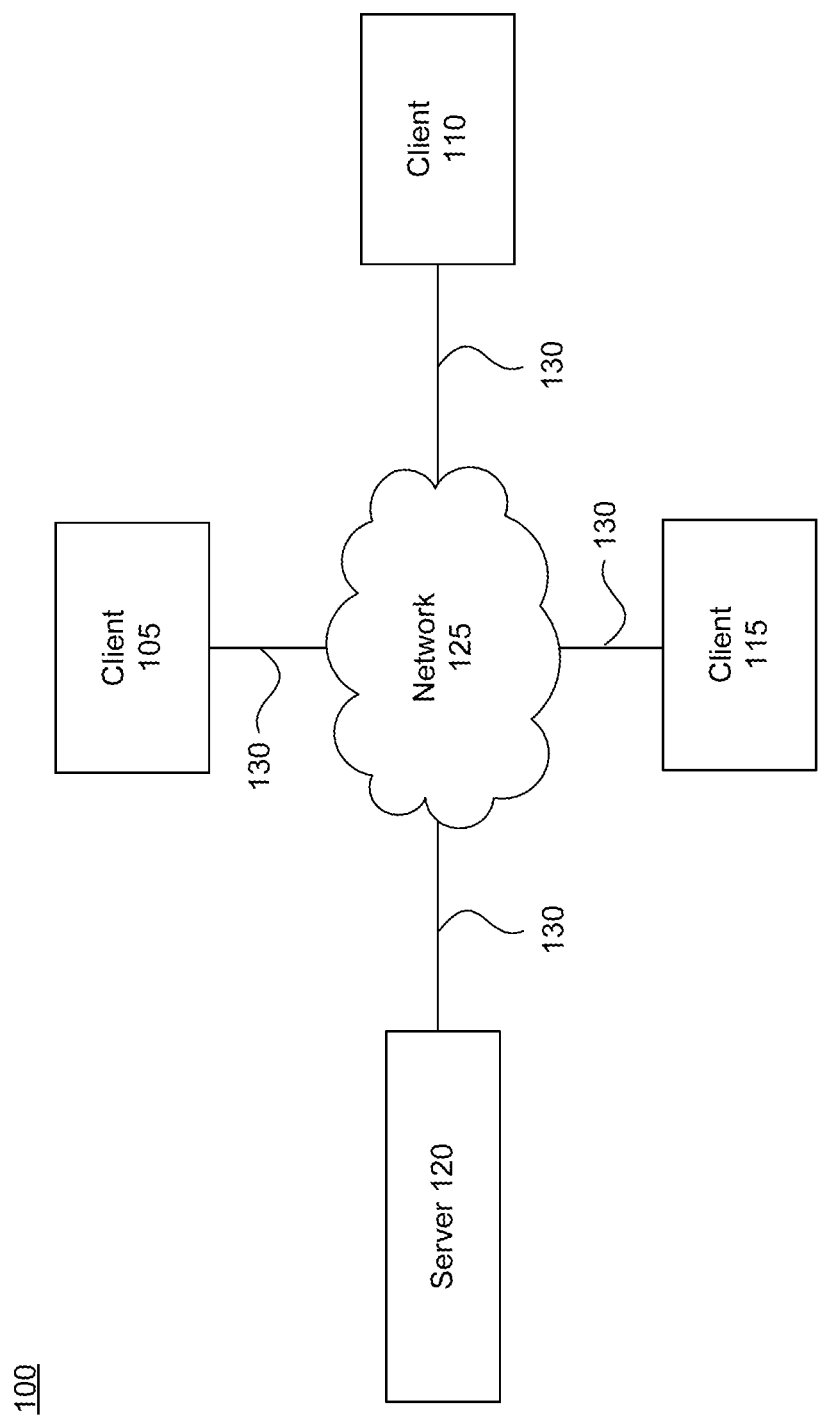
FIG. 1 is a block diagram of a distributed computer network incorporating a specific embodiment of a system for validating third party software, according to some embodiments.

The following embodiments describe systems and methods for providing third party certificate management for improved authentication and reduction vulnerabilities in mobile app communication. According to some embodiments, FIG. 1 is a simplified block diagram of a distributed computer network 100 incorporating a specific embodiment of a system for pin validation for third party software without operational overhead. Computer network 100 may include a number of client systems 105, 110, and 115, and a server system 120 (or server 120) coupled to a communication network 125 via a plurality of communication links 130. Communication network 125 provides a mechanism for allowing the various components of distributed network 100 to communicate and exchange information with each other.

It can be appreciated that pin validation may refer to certificate pinning (or certificate pinning) that restricts which certificates are considered valid for a particular website being accessed from client system 105 for example, or a mobile app running on client system 105 (or client 105), in order to limit risks of malicious attacks. For example, instead of allowing any certificate to be used, an operator may "pin" the certificate authority (CA) issuer's public keys or even end-entity certificates of their choice. In conjunction with FIG. 1, FIG. 2 will further describe the operations of the certificate pinning of third party software development kits (SDKs) certificates at the client system 105.

Continuing with FIG. 1, according to some embodiments, communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

According to some embodiments, client systems 105, 110, and 115 typically request information from a server system which provides the information. Server systems typically have more computing and storage capacity than client systems. However, a particular computer system may act as both a client or a server depending on whether the computer system is requesting or providing information. Aspects of the system may be embodied using a client-server environment or a cloud computing environment.

According to some embodiments, server 120 may be responsible for receiving information requests from client systems 105, 110, and 115, performing processing required to satisfy the requests, and responding to the requests with results based on the processing. The processing required to satisfy the request may be performed by server system 120 or may alternatively be delegated to other servers connected to communication network 125. For example, server 120 may be an organization backend server configured to aggregate third party certificates (including public keys of one or more third parties) and transmit the aggregate third party certificates to client system 105 via a push notification for example.

Client systems 105, 110, and 115 enable users to access and query information or applications stored by server system 120. A client system may be a computing device. Some example client systems include desktop computers, portable electronic devices (e.g., mobile communications devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

According to some embodiments, client system 105 may include mobile applications that include SDKs that facilitate the creation of applications by having a compiler, debugger, and perhaps a software framework. SDKs provide a powerful tool behind web communication and the implementation of third party application programming interfaces (APIs). According to some embodiments, pinning allows websites or applications to control the risk of miss issuance, CA compromise, or man-in-the-middle attacks. Pinning takes multiple forms depending on the use. For example, certificate pinning was also introduced in applications. According to some embodiments, a mobile app could pin a certificate, and the mobile app would then refuse any connection to the server if it was not using that specific certificate, thereby protecting users from any man-in-the-middle attack. This method requires that every app installed on a mobile device, for example, to have certificate pinning capabilities, thereby increasing the mobile complexity, cost, and requisite computational overhead of the mobile system (e.g., mobile system 105) required to process certificate pinning for each app. Moreover, each mobile app may be running a multitude of SDKs that serve different functions, including, for example, data collection for enhanced user experiences. Such SDKs do not typically have the capability to perform certificate pinning operations, thereby exposing other SDKs and the mobile app to vulnerabilities like man-in-the-middle attacks.

According to some embodiments, the sole reliance on a mobile app and/or an SDK running on the mobile app to perform its own pinning operations may continue to expose a mobile system 105 to risks, as it requires each SDK and mobile app to accurately perform its pinning. Moreover, the security strength and/or weakness of client system 105 as a whole depends on its weakest point (i.e., most vulnerable mobile app/SDK that may or may not have properly executed a pinning operation). Thereby, client system 105 may be classified as only being as strong as its most vulnerable SDK. That is because when an attack occurs due to a man-in-the-middle attack, for example, the malicious activity is no longer limited to only the SDK or the mobile app. The SDK and the mobile app, like others installed on client system 105, may reside within one or more memories of client system 105 and thereby can all be subject to the malicious attack.

Figure 2:
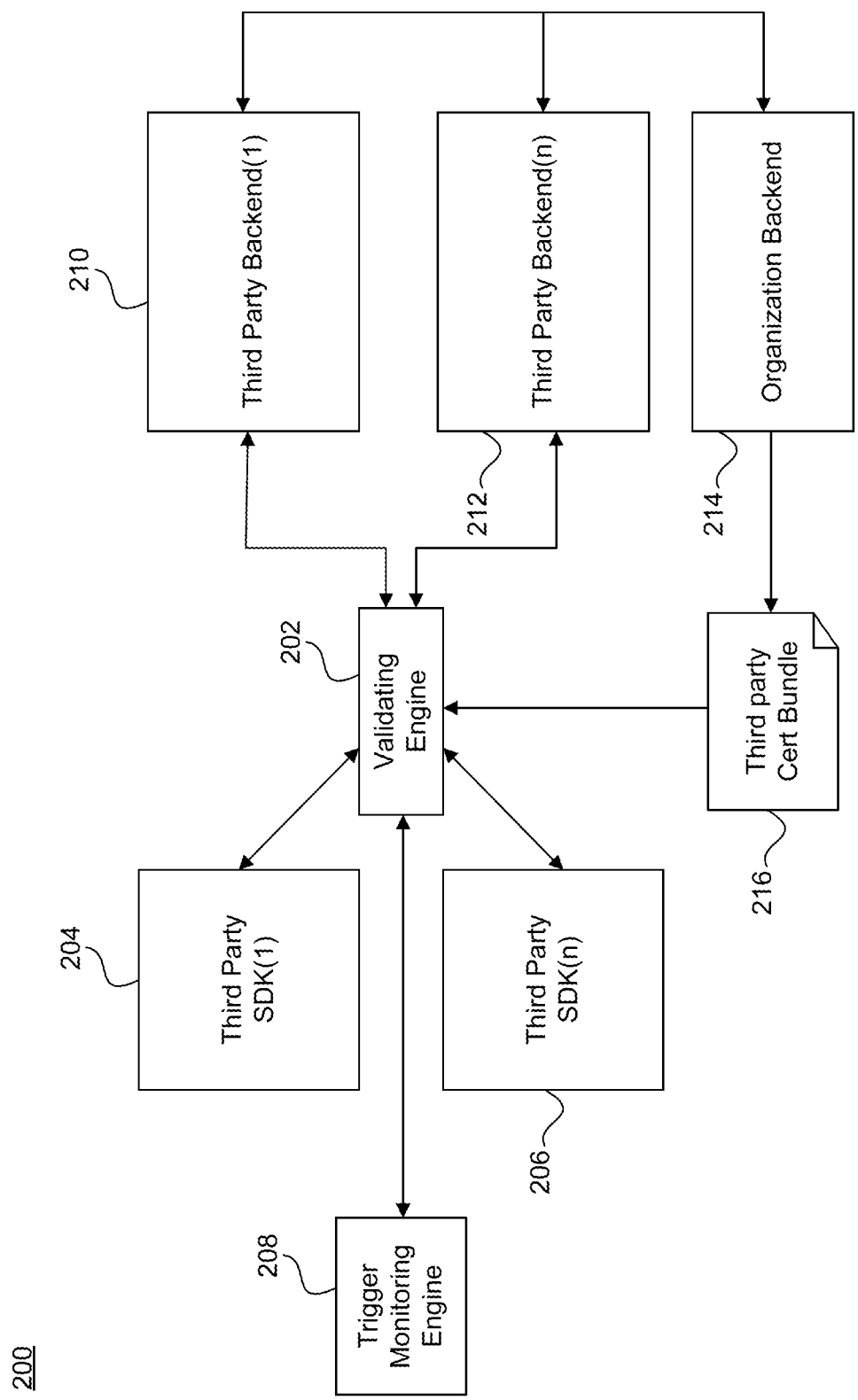
FIG. 2 is a block diagram of a validating operation, according to some embodiments.

FIG. 2 is a block diagram of a validating operation 200, according to some embodiments. Validating operation 200 may include components within a mobile device (e.g., client system 105) and outside of the mobile device that enable a certificate pinning validation operation as further discussed herein. According to some embodiments, components within a mobile device may include a validating engine 202, third party SDKs 204-206, and trigger monitoring engine 208. It can be appreciated that third party SDKs 204-206 may include and be associated with one or more mobile apps running on a mobile device such as client system 105. According to some embodiments, third party SDKs may also collect data associated with the mobile device. According to some embodiments, third party SDKs 204-206 may communicate with third party back end servers 210-212 to perform initialization, download/upload files, etc. According to some embodiments, validating operation 200 may also be performed, in part, by an organization backend 214 that may collect one or more certificates from the third party back end servers 210-212 and pass it on to the mobile device (e.g. mobile system 105). As described herein, organization backend 214 may include server 120 collecting one or more certificates of third party back end server 210-212, grouping them in third party certificate bundle 216 and sending the bundle to validating engine 202 of client system 105. Third party certificate bundle 216 may be a list of one or more third party certificates compiled (e.g., bundled) together by organization backend 214 and pushed to a user system, e.g., mobile system 105. It can be appreciated that organization backend 214 may collect all third party certificates from third party back end servers (e.g., third party back end server 210-212) and bundles them together in the list. Accordingly, after compilation, organization backend 214 may then transmit the bundle to mobile system 105 via push notification.

According to some embodiments, a mobile application uses third party SDKs (e.g., required for detecting code obfuscation, and/or generating marketing data for downstream uses). One challenge is that SDKs don't all come with certificate pinning by default. Accordingly, as discussed herein, client system 105, and all installed applications/SDKs may be vulnerable to malicious attacks where, for example, an SDK either does not pin a certificate or is not properly equipped to detect a malicious attack like a man-in-the-middle attack when verifying a public key from a third party back end (e.g., back end server 210). It can be appreciated that in cryptography and computer security, a man-in-the-middle, monster-in-the-middle, machine-in-the-middle, monkey-in-the-middle (MITM) or person-in-the-middle (PITM) attack represent a cyberattack where the attacker secretly relays and possibly alters the communications between two parties who believe that they are directly communicating with each other (e.g., SDK 204 and back end server 210). One example of a MITM attack is active eavesdropping, in which the attacker makes independent connections with the victims and relays messages between them to make them believe they are talking directly to each other over a private connection, when in fact the entire conversation is controlled by the attacker. The attacker may intercept all relevant messages passing between the two victims and inject new ones. According to some embodiments, an attacker within the reception range of an unencrypted Wi-Fi access point could insert themselves as a man-in-the-middle. This is especially relevant for mobile devices (e.g., client system 105) that frequently hop between networks to maintain connectivity and communication. As it aims to circumvent mutual authentication, a MITM attack can succeed only when the attacker impersonates each endpoint sufficiently well to satisfy their expectations.

Returning to operation 200, operation 200 may include some form of endpoint authentication specifically to prevent MITM attacks, for example, by authenticating one or both parties using a mutually trusted certificate authority prior to the loading of any SDK and/or app associated with the SDK. According to some embodiments, when an app is launched/initialized or running, a third party SDKs would communicate with third party backend server (e.g. SDK 204 with backend server 210).

In order for the communication to be facilitated, third party SDK 204 would need to trust backend server 210. Since third party SDK 204 may not have the capability to perform the certificate pinning because the third party SDK 204 cannot validate that a public key received from the third party backend server 210 belongs to the third party backend server 210. In this regard, validating engine 202 may collect any and all third party certificates received from organization backend 214 and perform the authentication on behalf of installed mobile apps and/or third party SDKs. According to some embodiments, organization backend 214 may generate a bundle of third party certificates and send the third party certificate bundle 216 to a mobile device (e.g., client system 105). In one example, a third party certificate may be a leaf transport layer security (TLS) certificate or a secure sockets layer (SSL) certificate. It can be appreciated that organization backend 214 may send the certificate bundle 216 via push notification to client system 105. According to some embodiments, upon receiving the third party certificate bundle 216, validating engine 202 may attempt to pin the certificate for the SDK (e.g., third party SDK 204) by communicating with third party backend server 210 for example. In this regard, if validating engine 202 is not able to validate/pin a certificate with third party backend server 210 (associated with a third party SDK 204 for example), validating engine 202 may be configured to determine that the end point is malicious (e.g., third party backend server 210) and not load (or block) third party SDK 204. It can be appreciated that blocking the third party SDK 204 may include disabling it when it has been previously running/active. According to some embodiments, if validating engine 202 is able to validate/pin a certificate with third party backend server 210, then validating engine 202 may be configured to load or activate or continue running third party SDK 204.

According to some embodiments, this ensures that only pinned certificates for third party SDKs are loaded and may run on client system 105, thereby ensuring that vulnerable SDKs are not loaded and will not expose client system 105 to such vulnerabilities. Validating engine 202 may also communicate the blocking of third party SDK 204 to third party backend server 210 for further analysis.

According to some embodiments, validating engine 202 may perform certificate pinning operations on a periodic basis. For example, trigger monitoring engine 208 may be programmed to cause validating engine 202 to perform certificate pinning and certification on a periodic basis (e.g., every few minutes or every hour and the like). As discussed herein, trigger monitoring engine 208 may also be programmed to detect specific events that will cause a trigger for validating engine 202 to perform a certificate pinning operation (e.g., change in network connections). According to some embodiments, a third party SDK (e.g., third party SDK 204) that is blocked from loading or stopped from running, due to a detected anomaly such as an issue with the certificate pinning operation engine, can be recertified by validating engine 202 after a predetermined period of time has lapsed. For example, trigger monitoring engine 208 may trigger validating engine 202 to make a periodic attempt to recertify the certificate associated with the third party back end (e.g., third party backend 210) that third party SDK 204 will communicate with. This can be done after a predetermined period of time has lapsed (e.g., 5 minutes or the like). In the event that validating engine 202 can validate the certificate associated with third party backend 210, validating engine 202 can load third party SDK 204. It can be appreciated that the loading of the SDKs may be performed during a startup/bootstrapping operations and/or after an SDK has been previously blocked.

According to some embodiments, validating engine 202 may be configured to perform multiple tasks, including but not limited to: validating a certificate, loading/blocking an SDK, and communicate the risk/vulnerability information of a third party SDK to organization backend 214. According to some embodiments, by shifting the certificate pinning responsibilities from an SDK (recognizing that most SDKs do not have this capability to begin with) to validating engine 202 may enable client system 105 to be able to accept any third party SDK but only load/run the SDK that includes a pinned certificate. Additionally, validating engine 202 may be configured to transmit the risks/vulnerabilities of third party SDKs to organization backend 214. These may include, for example, identifications of third party SDKs as well as identifications of third party backend(s) that have failed the certificate pinning validation process.

According to some embodiments, organization backend 214 may receive risk/vulnerability information from a plurality of validating engines. Based on the risk/vulnerability information received from the plurality of validating engines, organization backend 214 may be able to determine whether a certificate pinning failure is due to a local risk (e.g., local to client 105 like a specific issue with the SDK, network connection risks, etc.), or whether there is a global failure affecting the third party backend (e.g., a website or a portal supported by third party backend 210 has been hacked/compromised). According to some embodiments, when organization backend 214 determines that a specific third party backend is compromised, organization backend may alert all or a number of validating engines to stop communicating with the third party backend. Accordingly, this process may enable organization backend 214 to stop a malicious attack associated with a third party backend from spreading to devices (e.g. client systems 105, 110, and/or 115) running a mobile app (e.g., mobile app 404 below).

According to some embodiments, client system 105 may include trigger monitoring engine 208 that detects changes in network connectivity of client system 105. As noted herein, client system 105 may be a mobile device that continuously hops between networks in order to maintain connectivity and communication. According to some embodiments, if client system 105 is within a home WiFi network, trigger monitoring engine 208 remains on standby as the network configurations have not changed. However, if client system 105 is moved to another environment where it is connected to a different network (e.g., user of mobile device leaves the home and enters a moving vehicle where the mobile device connects to a different network), trigger monitoring engine 208 will transmit a notification to validating engine 202 to re-certify SDKs 204-206. Accordingly, trigger monitoring engine 208 may be activated whenever a change in the network that client system 105 is connected to occurs. It can be appreciated that the changes to the network may be between service provider cellular data networks, wireless networks, WiFi networks and the like.

According to some embodiments, if client system 105 connects to a new network that may be vulnerable to attacks and validator engine 202 detects a different public key, then validator engine 202 may block a third party SDK (e.g., third party SDK 204) from further communication with respective third party backend server (e.g., third party backend server 210). It can be appreciated that a blocked third party SDK will not be able to communicate data to a third party backend and the third party backend will not be able to receive any further data from the SDK, including, for example, analytical data associated with client system 105. Accordingly, it can be appreciated that trigger monitoring engine 208 may monitor environmental metrics associated with client system 105 and create trigger events in response to changes in environmental metrics (e.g., changes in network endpoint connection, etc.). It can also be appreciated that trigger monitoring engine 208 may create trigger events in response to other events in addition to network changes. For example, trigger monitoring engine 208 may be configured to create trigger events in response to security updates, patches being applied, a new mobile app, or new version of an existing mobile app, and/or in response to determining client system 105 may be a jail broken device.

Figure 3:
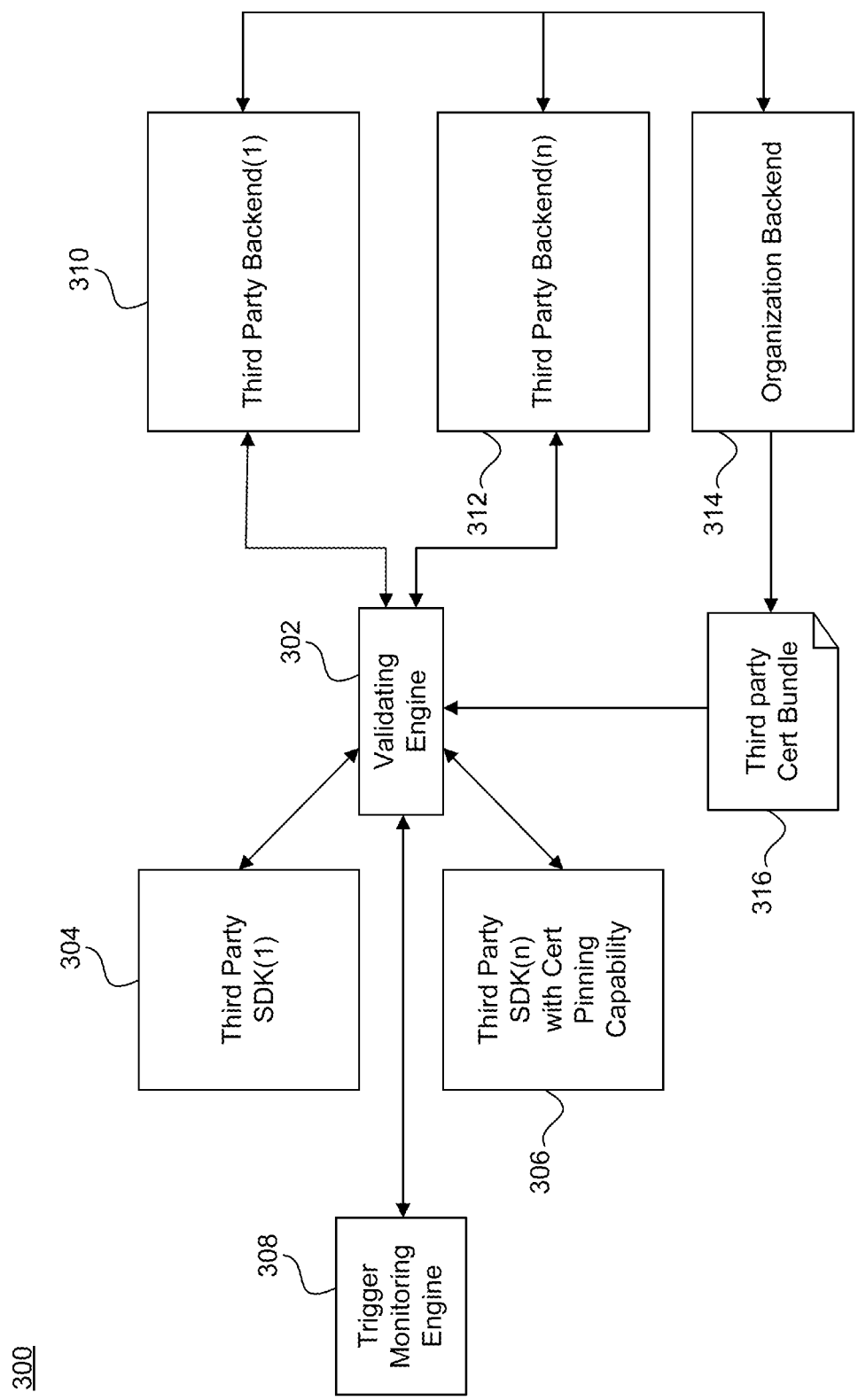
FIG. 3 is a block diagram of a validating operation, according to some embodiments.

FIG. 3 is a block diagram of a validating operation, according to some embodiments. The validating operation of FIG. 3 largely corresponds to the validating operation described herein with respect to FIG. 2, except for a scenario where an SDK may have validating capabilities. For example, FIG. 3 is a block diagram of a validating operation 300, according to some embodiments. Validating operation 300 may leverage components within a mobile device (e.g., client system 105) and outside of the mobile device that enable a certificate pinning validation operation as further discussed herein. According to some embodiments, components within a mobile device may include a validating engine 302, third party SDKs 304-306, and trigger monitoring 308. It can be appreciated that third party SDKs 304-306 may include and be associated with one or more mobile apps running on a mobile device such as client system 105. According to some embodiments, third party SDKs may also collect data associated with the mobile device. According to some embodiments, third party SDKs 304-306 may communicate with third party back end servers 310-312 to perform initialization, download/upload files, etc. According to some embodiments, validating operation 300 may also be performed, in part, by an organization backend 314 that may collect one or more certificates from the third party back end servers 310-312 and pass it on to the mobile device (e.g. mobile system 105). As described herein, organization backend 314 may include server 120 collecting one or more certificates of third party back end server 310-312, grouping them in third party certificate bundle 316 and sending the bundle to validating engine 302 of client system 105.

According to some embodiments, third party SDK 306 may have a certificate pinning capability. As noted herein, a large number of third party SDKs do not have the capability to perform certificate pinning. However, some third party SDKs do have this capability. Accordingly, it would be beneficial if validating engine 302 may be configured to coordinate certificate pinning operations with a third party SDK that has certificate pinning capability. According to some embodiments, as described herein, validating engine 302 may receive third party certificate bundle 316 from organization backend 314. Upon determining that third party SDK 306 has certificate pinning capabilities, validating engine 302 may be configured to pass on the received certificate associated with third party backend 310 to third party SDK 306 to perform the validation. It can be appreciated that in a situation where third party SDK 306 is not able to perform the certificate pinning and/or authenticate the third party backend 310, third party SDK 306 may notify validating engine 302 of this failure and validating engine 302 may either attempt to perform the certificate pinning itself, or may block third party SDK 306 from loading or running. It can be appreciated that such blocking operation may last until a trigger signal from trigger monitoring engine 308 is received (e.g., on a periodic basis or based on an occurrence of a trigger event).

Figure 4:
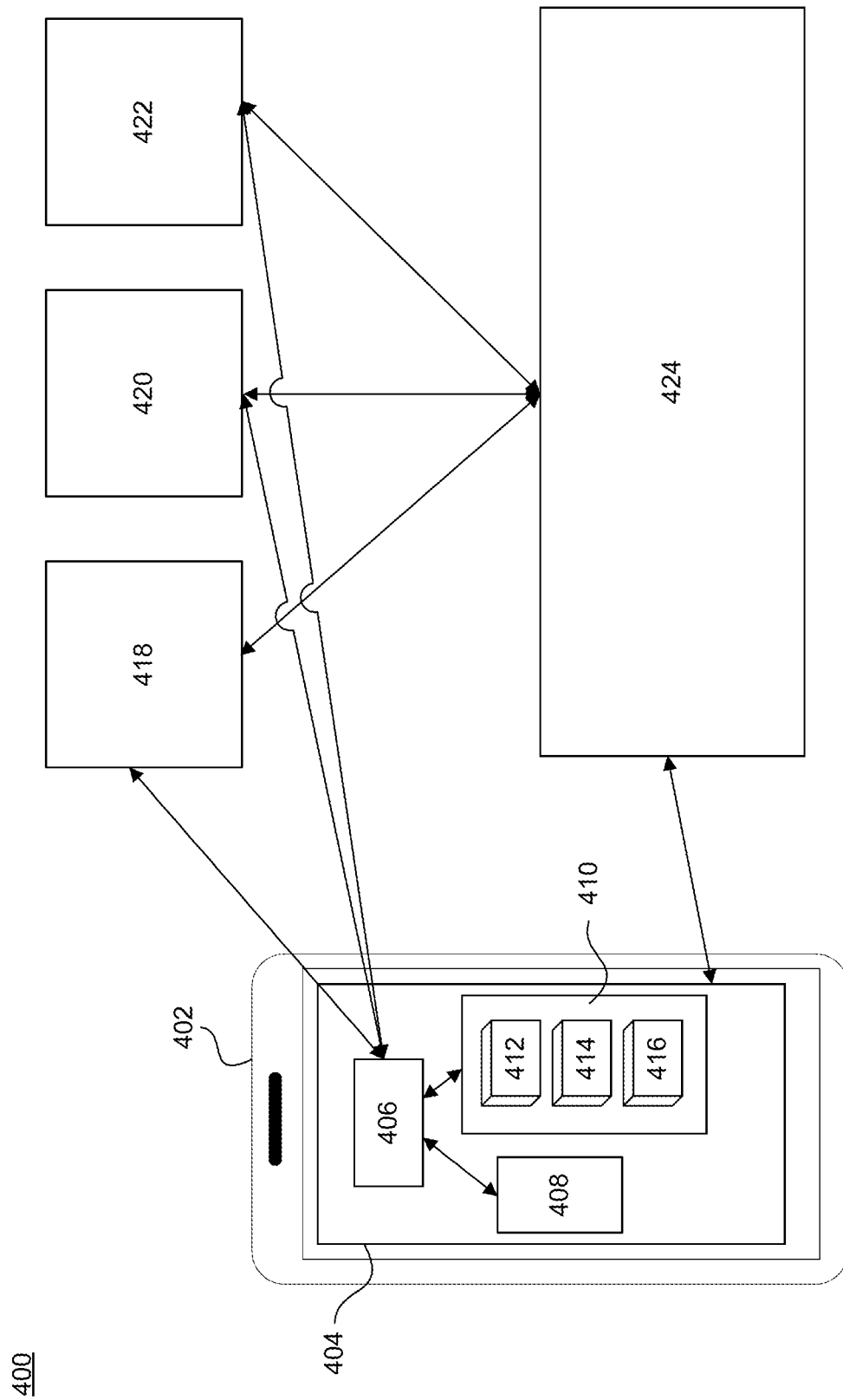
FIG. 4 is a block diagram of a distributed computer network illustrating a validating operation, according to some embodiments

FIG. 4 is a block diagram of a distributed computer network 400 illustrating a validating operation, according to some embodiments. Distributed computer network 400 may include a mobile device 402 running a mobile app 404. According to some embodiments, mobile device 402 may also include validating engine 406, trigger monitoring engine 408, feature toggle 410, third party SDKs 412-416, third party backend servers 418-422 and organization backend server 424. According to some embodiments, backend server 424 may receive root certificates from third party backend servers 418-422, which backend server 424 can then package into a bundle and send to mobile device 402. It can be understood by those skilled in the art that in cryptography and computer security, the root certificate is the public key certificate that identifies a root certificate authority (CA). As described herein, backend server 424 may place the bundle in an S3 bucket for access by mobile device 402, and/or be sent via push notification to mobile device 402. According to some embodiments, upon receiving the push notification, validating engine 406 may communicate with third party back end servers 418-422 in order to validate the certificates and facilitate communication with their respective SDKs.

According to some embodiments, validating engine 406 may initially validate the bundle itself as a valid communication from the organization backend server 424. This ensures that vulnerabilities (e.g., MITM attack) are eliminated even between mobile device 402 and organization backend server 424. According to some embodiments, if there is a validation failure between mobile device 402 and organization backend server 424, then validating engine 406 may rely on previously stored certificate bundle information until backend availability is restored and the bundle information is fixed. Accordingly, it can be appreciated that validating engine 406 can always maintain a valid copy of the certificate bundle. This enables validating engine 406 to have the ability to always run (e.g., for mobile device 402 to run an APP) even when there is service/authentication failure by depending on the last (e.g., seed) bundle. According to some embodiments described herein, feature toggle 410 may be configured to block certain SDKs whose certificates are not pinned.

Figure 5:
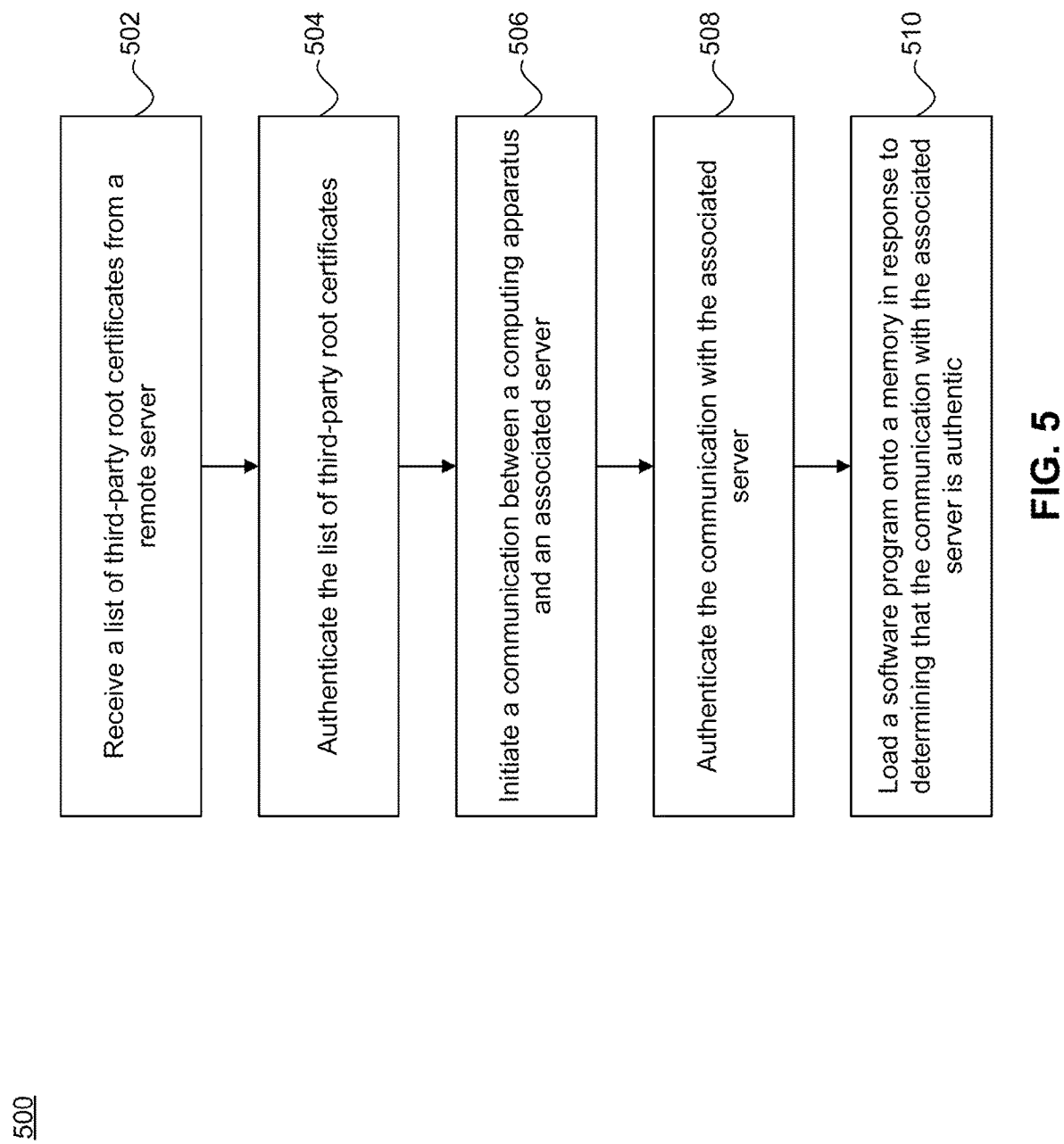
FIG. 5 is a flowchart representing a method for validating third party software on a computing device, according to some embodiments.

FIG. 5 is a flowchart representing a method 500 for validating third party software on a computing device. It can be appreciated that method 500 may be performed by any one of the devices described in FIG. 1 and/or FIG. 6. At step 502, method 500 includes receiving a list of third party root certificates from a remote server, the list of third party root certificates including at least one association between a program configured to run on the computing apparatus and a public key for authenticating communication between the program and an associated server of the program. According to some embodiments, the program may be a software program. According to some embodiments, the program may be a mobile app and/or a third party SDK. According to some embodiments, the list may correspond to the certificate bundle described herein that is generated by an organization backend server (e.g., server 214) after receiving a root certificate from one or more third party backend servers.

At step 504, method 500 may further include authenticating the list of third party root certificates by verifying a private key associated with the remote server. For example, upon receiving the bundle from the organization backend server, mobile device 402 (e.g., validating engine 406) may verify a private key of the organization backend server to authenticate the received bundle. This ensures that the communication from the organization backend server is valid. According to some embodiments, authenticating the list of third party root certificates may also include awaiting a second list of third party root certificates from server 214 in response to determining that the communication with the associated server is not authentic. For example, where validating engine 406 cannot authenticate a communication with a third party server, validating engine 406 may await reception of a second list of third party root certificates. After receiving the second list of third party root certificates, if the communication is deemed authentic, then validating engine 406 may load the third party SDK onto one or more memories. According to alternative embodiments, if a time period needed to receive a second list of third party root certificates is sufficiently long, trigger monitoring engine 408 may trigger validating engine 406 to re-authenticate the communication with third party server. In response, if the communication is deemed authentic, then validating engine 406 may load the third party SDK. Alternatively, if the communication is deemed not authentic, then validating engine 406 may continue to block (or unload if necessary) the third party SDK.

At step 506, method 500 may further include initiating a communication between the computing apparatus (e.g., mobile device 402) and the associated server (e.g., 418). As described herein, this communication enables the validating engine of the mobile device 402 to validate the communication with third party backend server 418 in order to determine whether to upload the associated SDK or block it.

At step 508, method 500 may further include authenticating the communication with the associated server using the public key received in the bundle. Accordingly, at step 510, the method further includes loading the software program (e.g., SDK) onto the one or more memories during a bootstrapping process in response to determining that the communication with the associated server is authentic.

According to some embodiments, method 500 may also include a step of blocking the loading of the software program onto the one or more memories during the bootstrapping process in response to determining that the communication with the associated server is not authentic. Based on the blocking, method 500 may also include notifying the associated server that the software program was not loaded onto the one or more memories and is not running on the computing device.

According to some embodiments, a goal of the present disclosure is to increase the operational security of a mobile device running apps that can potentially access malicious end points. According to some embodiments, the disclosed methods enable a mobile device to control how an app, and specifically, an SDK within an app to be loaded within an app space. The loading operation may be determined based on certificate pinning operations for each SDK and determining whether to load/run an SDK based on the authentication results. Such methodology enables a mobile device (or a computing device described herein) to control how apps and SDKs are loaded/run. Such control provides several benefits. According to some embodiments, a benefit may be that the mobile device can control/not run or block SDKs that may introduce vulnerabilities within the app space and/or the mobile device as a whole. This is because the SDK certificate pinning and authentication is performed by a validating engine rather than depending on each individual capability of a third party SDK. In other words, such processing imputes potential risks introduced by individual SDKs to the rest of the SDKs/mobile device by controlling which SDKs are safe to run.

According to some embodiments, another benefit may be that the validating engine may be optimized for performance of the mobile device. For example, carefully configuring for the third party certificate pinning validation can be done based on event changes (e.g., when the mobile device connects to a new network, or if the SDK is frequently loaded within the app (indicating that the SDK may constantly be flagged as vulnerable).

According to some embodiments, an operational overhead of mobile device processing may be improved by centralizing the certificate pinning control within validating engine 302. For example, relying on individual certificate pinning operations of every SDK not only introduces vulnerabilities (because not all SDKs have such capabilities), but also, requires a processing capability to constantly update SDK configurations and settings in order for the SDK to properly perform the authentication processing. This is an inefficient process that is significantly reduced by centralizing the processing of third party certificate pinning (e.g., within the validating engine).

Figure 6:
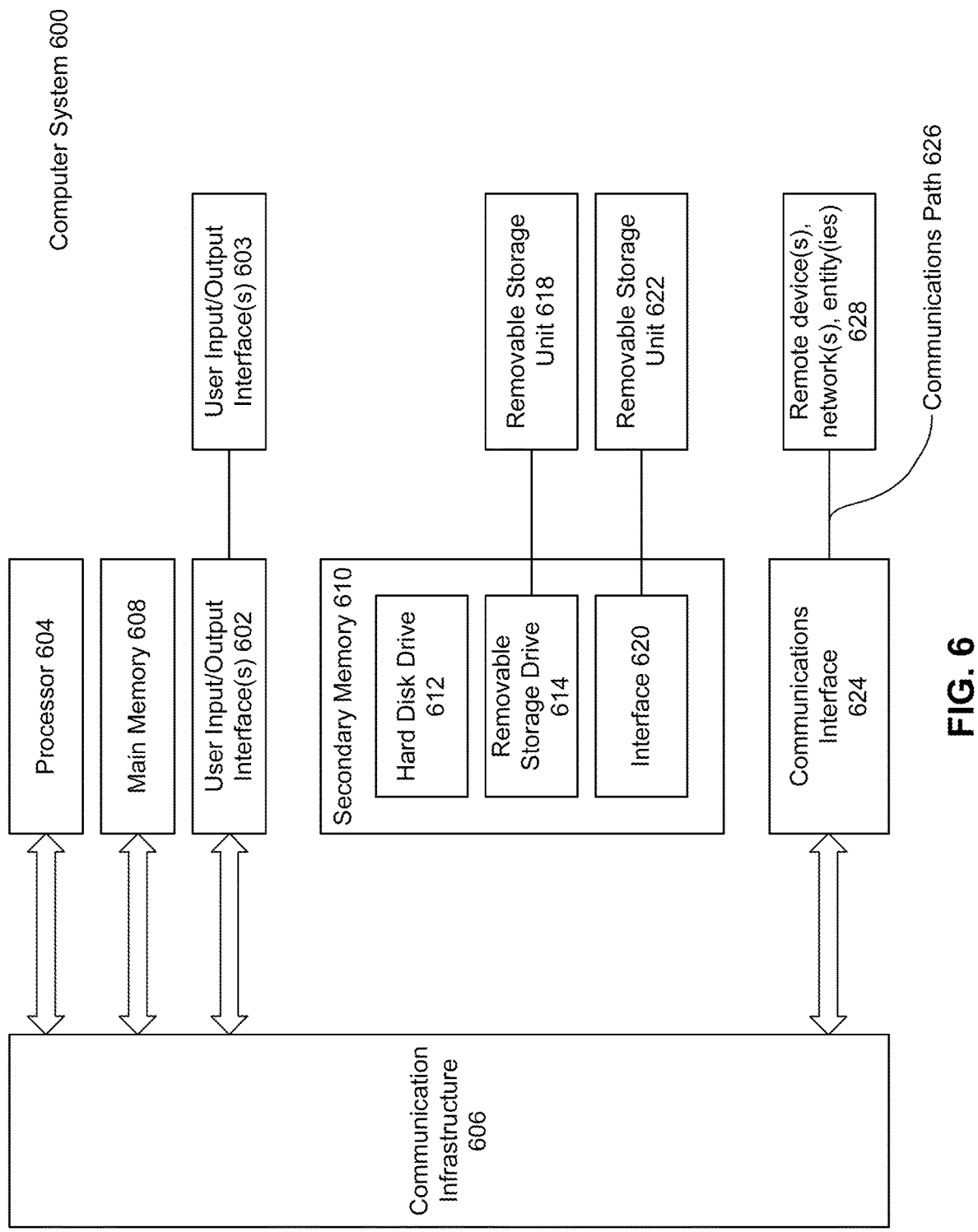
FIG. 6 illustrates a computer system that carries out the user action intent signaling and management method, according to some embodiments.

FIG. 6 illustrates a computer system that carries out the user action intent signaling and management method, according to some embodiments. Various embodiments of the disclosure may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 503, such as monitors, keyboards, pointing devices, etc., which may communicate with communication infrastructure 506 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random-access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 564. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein. For example, the instructions, when executed by one or more processors, cause the processors to perform a method for managing third party applications on a computing apparatus as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system embodiments other than those described herein.

Descriptions to an embodiment contemplate various combinations, components and sub-components. However, it will be understood that other combinations of the components and sub-components may be possible while still accomplishing the various aims of the present application. As such, the described embodiments are merely examples, of which there may be additional examples falling within the same scope of the disclosure.

What is claimed is:

1. A computing apparatus, comprising:
one or more processors; and
one or more memories having instructions stored thereon that, when executed by the one or more processors, cause the one or more processors to:
receive a list of third party root certificates from a remote server, the list of third party root certificates including at least one association between a third party software development kit (SDK) configured to run on the computing apparatus and a public key for authenticating communication between the third party SDK and an associated server of the third party SDK; and
determine whether the third party SDK has a certificate pinning capability, and after determining that the third party SDK does not have the certificate pinning capability, cause the one or processors to;
authenticate the list of third party root certificates by verifying a private key associated with the remote server;
initiate a communication between the computing apparatus and the associated server;
authenticate the communication with the associated server using the public key, and
load the third party SDK into the one or more memories during a bootstrapping process in response to determining that the communication with the associated server is authentic.

2. The computing apparatus of claim 1, wherein the one or more processors are further configured to block the loading of the third party SDK into the one or more memories during the bootstrapping process in response to determining that the communication with the associated server is not authentic.

3. The computing apparatus of claim 2, wherein the one or more processors are further configured to notify the associated server that the third party SDK was not loaded in to the one or more memories and is not running on the computing apparatus.

4. The computing apparatus of claim 3, wherein the one or more processors are further configured to await a second list of third party root certificates from the remote server and load the third party SDK into the one or more memories in response to determining that the communication with the associated server is authentic.

5. The computing apparatus of claim 1, wherein the one or more processors are further configured to:
after determining that the third party SDK has the certificate pinning capability, cause the third party SDK to;
authenticate the list of third party root certificates by verifying the private key associated with the remote server;
initiate the communication between the computing apparatus and the associated server; and
authenticate the communication with the associated server using the public key.

6. The computing apparatus of claim 1, further comprising an environmental monitoring engine configured to detect environmental changes associated with the computing apparatus, the environmental changes including network access changes.

7. The computing apparatus of claim 6, wherein the environmental monitoring engine is further configured to send a request to the one or more processors to re-authenticate communication with the associated server in response to the detected environmental changes.

8. The computing apparatus of claim 7, wherein the one or more processors are further configured to disable the third party SDK in response to a failed re-authentication with the associated server.

9. The computing apparatus of claim 1, wherein the authentication includes detecting a man-in-the-middle attack.

10. A computer-implemented method for managing third party applications on a computing apparatus, the method comprising:
receiving, at a computing device including one or more processors, a list of third party root certificates from a remote server, the list of third party root certificates including at least one association between a third party software development kit (SDK) configured to run on the computing apparatus and a public key for authenticating communication between the third party SDK and an associated server of the third party SDK; and
determining whether the third party SDK has a certificate pinning capability, and after determining that the third party SDK does not have the certificate pinning capability;
authenticating, by the computing apparatus, the list of third party root certificates by verifying a private key associated with the remote server;
initiating, by the computing apparatus, a communication between the computing apparatus and the associated server;

authenticating, by the computing apparatus, the communication with the associated server using the public key; and loading, by the computing apparatus, the third party SDK into one or more memories of the computing apparatus during a bootstrapping process in response to determining that the communication with the associated server is authentic.

11. The computer-implemented method of claim 10, further comprising:

blocking the loading of the third party SDK into the one or more memories during the bootstrapping process in response to determining that the communication with the associated server is not authentic.

12. The computer-implemented method of claim 11, further comprising:

notifying the associated server that the third party SDK was not loaded into the one or more memories and is not running on the computing apparatus.

13. The computer-implemented method of claim 11, further comprising:

awaiting a second list of third party root certificates from the remote server; and loading the third party SDK into the one or more memories in response to determining that the communication with the associated server is authentic.

14. The computer-implemented method of claim 10, further comprising:

after determining that the third party SDK has the certificate pinning capability, causing the third party SDK to;

authenticate the list of third party root certificates by verifying the private key associated with the remote server;

initiate the communication between the computing apparatus and the associated server; and authenticate the communication with the associated server using the public key.

15. The computer-implemented method of claim 10, further comprising:

Detecting, by an environmental monitoring engine, environmental changes associated with the computing apparatus, the environmental changes including network access changes.

16. The computer-implemented method of claim 5, further comprising:

re-authenticating communication with the associated server in response to detecting the detected environmental changes.

17. The computer-implemented method of claim 16, further comprising:

disabling the third party SDK in response to a failed re-authentication with the associated server.

18. The computer-implemented method of claim 10, wherein the authenticating further comprises detecting a man-in-the-middle attack.

19. A non-transitory computer-readable medium including instructions that, when executed by one or more processors, cause the one or more processors to perform a method for managing third party applications on a computing apparatus, the method comprising:

receiving, at a computing device including one or more processors, a list of third party root certificates from a remote server via a push notification, the list of third party root certificates including at least one association between a third party software development kit (SDK) configured to run on the computing apparatus and a public key for authenticating communication between the third party SDK and an associated server of the third party SDK; and determining whether the third party SDK has a certificate pinning capability, and after determining that the third party SDK does not have the certificate pinning capability;

authenticating, by the computing apparatus, the list of third party root certificates by verifying a private key associated with the remote server;

initiating, by the computing apparatus, a communication between the computing apparatus and the associated server;

authenticating, by the computing apparatus, the communication with the associated server using the public key; and loading, by the computing apparatus, the third party SDK into one or more memories of the computing apparatus during a bootstrapping process in response to determining that the communication with the associated server is authentic.

20. The non-transitory computer-readable medium of claim 19, further comprising:

after determining that the third party SDK has the certificate pinning capability, causing the third party SDK to;

authenticate the list of third party root certificates by verifying the private key associated with the remote server;

initiate the communication between the computing apparatus and the associated server; and authenticate the communication with the associated server using the public key.

* * * * *